United States Patent
Hirota

(10) Patent No.: US 7,550,409 B2
(45) Date of Patent: Jun. 23, 2009

(54) PROTECTIVE LAYER THERMAL TRANSFER FILM AND PRINTED ARTICLE

(75) Inventor: Kenichi Hirota, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 98 days.

(21) Appl. No.: 11/663,827

(22) PCT Filed: Sep. 28, 2005

(86) PCT No.: PCT/JP2005/017821

§ 371 (c)(1),
(2), (4) Date: Mar. 27, 2007

(87) PCT Pub. No.: WO2006/035805

PCT Pub. Date: Apr. 6, 2006

(65) Prior Publication Data

US 2008/0167185 A1    Jul. 10, 2008

(30) Foreign Application Priority Data

Sep. 30, 2004    (JP) .............................. 2004-287520

(51) Int. Cl.
  *B41M 5/035* (2006.01)
  *B41M 5/42* (2006.01)
  *B41M 5/50* (2006.01)
(52) U.S. Cl. .................. 503/227; 428/32.77; 428/32.81
(58) Field of Classification Search ........................ None
  See application file for complete search history.

(56) References Cited

U.S. PATENT DOCUMENTS 5,430,002 A    7/1995    Tamura et al.

FOREIGN PATENT DOCUMENTS

| JP | 3-82595 A | 4/1991 |
|---|---|---|
| JP | 9-99656 A | 4/1997 |
| JP | 2000-71626 A | 3/2000 |
| JP | 2000-80844 A | 3/2000 |
| JP | 2002-79766 A | 3/2002 |
| JP | 2002-274064 A | 9/2002 |
| JP | 2002-356067 A | 12/2002 |
| JP | 2005-096200 | * 4/2005 |

* cited by examiner

*Primary Examiner*—Bruce H Hess
(74) *Attorney, Agent, or Firm*—Birch, Stewart, Kolasch & Birch, LLP

(57) ABSTRACT

To provide a protective layer thermal transfer film which can form a protective layer that is superior in water-based ink fixing property, solvent-resistant property and, in particular, water-resistant property and also has a superior peeling property.

A protective layer thermal transfer film, comprising:

at least a release layer, and a protective layer, formed on one surface of a substrate film;

the release layer being formed from at least a silicone-modified resin and silicone oil; and a printed article with the protective layer transferred onto an image on the printed article.

5 Claims, 1 Drawing Sheet

PROTECTIVE LAYER THERMAL TRANSFER FILM AND PRINTED ARTICLE

TECHNICAL FIELD

The present invention relates to a protective layer thermal transfer film and a printed article having an image on which the protective layer of the film is transferred.

BACKGROUND ART

Conventionally, images such as tone images and monotone images including characters and symbols have been formed on a substrate through a thermal transfer system. With respect to the thermal transfer system, a heat-sensitive sublimation transfer system and a heat-sensitive melt transfer system have been widely used.

Of these systems, in the heat-sensitive sublimation transfer system, a thermal transfer film formed by supporting a dye layer made by melting or dispersing a sublimable dye serving as a colorant in a binder resin on a substrate is used, and with this thermal transfer film being superposed on an image-receiving film, energy is applied to a heating device such as a thermal head in accordance with image information so that the sublimable dye contained in the dye layer on the thermal transfer film is transferred to the image-receiving film to form an image thereon.

This heat-sensitive sublimation transfer system makes it possible to control the amount of dye transfer on a dot basis in response to the quantity of energy to be applied to the thermal transfer film; therefore, this system has the advantages of forming a superior tone image and of easily forming characters, symbols and the like.

In the image formed by the heat-sensitive sublimation transfer system, since the transferred dye is present on the surface of the image-receiving member, various techniques have been proposed to protect the image and to form a protective layer on the image from the viewpoints of image protection such as light resistance and abrasion resistance (for example, see Patent Document 1 and Patent Document 2).

However, among the printed articles sublimation-transferred, some of the printed articles call for a proper stamping property for use in water based type stamps (for example, printed articles used for certificate photographs such as passports). In other words, a proper fixing property for water based ink is required.

From the viewpoint of fixing property for water based ink, for example, in the field of ink-jet receiving layers, an ink-jet receiving layer in which the outermost surface layer is made of a water-absorbing resin such as polyvinyl alcohol (PVA) containing a large amount of particles such as silica has been known. However, the ink-jet receiving layer of this type is applied with a considerable amount of coating material (normally, 10 g/m$^2$ or more) so as to maintain a sufficient water based ink fixing property. Consequently, even in an attempt to utilize such a receiving layer as a protective layer for a printed article formed through the thermal transfer system, problems arise in which: the foil-separating property is poor and the transparency of the film becomes insufficient. With respect to the protective layer for a printed image formed through the thermal transfer system, a proper fixing property for water based stamp is required in addition to the thin-film and transparent properties; therefore, the techniques for the ink-jet receiving layer are hardly applied to the protective layer for a protective layer thermal transfer film.

Moreover, with respect to the protective layer of a printed article formed through the thermal transfer system such as a sublimation transfer system, a property that is contradictory to the water based ink fixing property, that is, a water-resistant property (by which no problem is raised even when wiped after having been moistened with water), is also required.

In the case where the protective layer is formed by using a water-absorbing resin so as to obtain a proper stamping property and the like, since the protective layer thermal transfer film has a peeling interface formed by using the water-absorbing resin, the corresponding film or sheet tends to be easily influenced by humidity, resulting in a change in the adhesion of the peeling interface and the subsequent problem of an insufficient peeling property. In particular, this problem becomes conspicuous before and after preservation under a high-temperature and high-humidity environment.

Patent Document 1: Japanese Patent Application Laid-Open No. 2000-80844

Patent Document 2: Japanese Patent Application Laid-Open No. 2000-71626

DISCLOSURE OF INVENTION

Problems to be Solved by the Invention

The present invention has been made to solve the above-mentioned problems, and its objective is to provide a protective layer thermal transfer film which can form a protective layer that is superior in the water based ink fixing property, solvent-resistant property and, in particular, water-resistant property and also has a superior peeling property.

Means to Solve the Problems

In other words, the present invention relates to a protective layer thermal transfer film, comprising:
 at least a release layer, and
 a protective layer, formed on one surface of a substrate film;
 the release layer being formed from at least a silicone-modified resin and silicone oil;

and also concerns a printed article having such a protective layer.

EFFECT OF THE INVENTION

The protective layer thermal transfer film of the present invention is superior in peeling properties.

A image-receiving member on which the protective layer of the protective layer thermal transfer film of the present invention has been transferred is superior in stamping properties for water based type materials as well as in writing properties for water based ink or the like.

EXPLANATION OF REFERENCES

Figure 1:
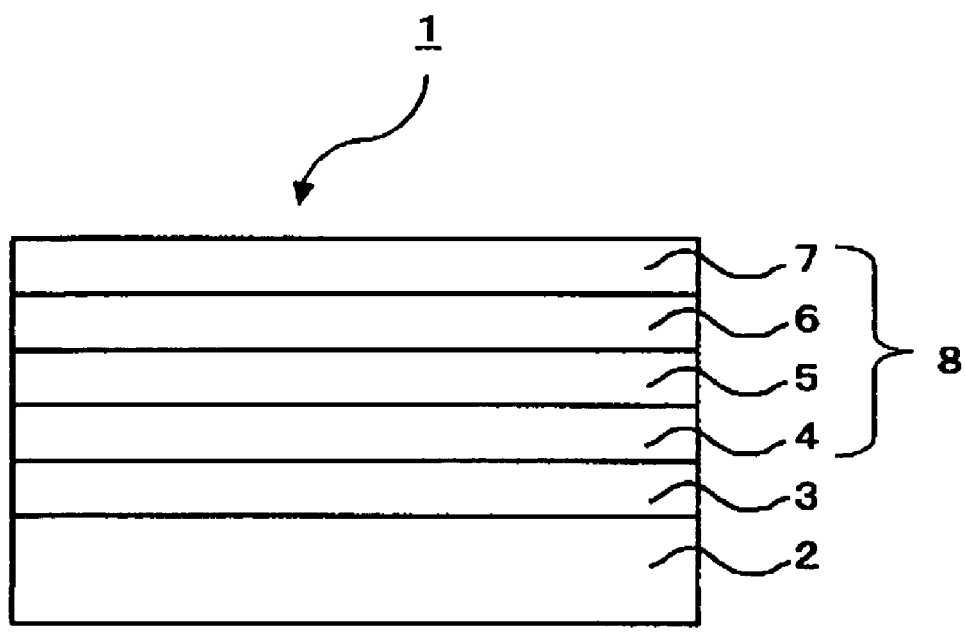
FIG. 1 is a schematic cross-sectional view that shows one embodiment of a protective layer thermal transfer film.

1 Protective layer thermal transfer film
2 Substrate film
3 Release layer
4 Peeling layer
5 Porous layer 6 Primer layer
7 Heat seal layer (HS layer)
8 Protective layer
21 Protective layer thermal transfer film
22 Substrate film
26 Thermal transfer protective layer
27 Back layer

BEST MODE FOR CARRYING OUT THE INVENTION

FIG. 1 is a schematic cross-sectional view that shows one example of a protective layer thermal transfer film of the present invention. In this Figure, the protective layer thermal transfer film 1 is constituted by a release layer 3, a peeling layer 4, a porous layer 5, a primer layer 6 and a heat seal layer (HS layer) 7 that are successively formed on one surface of a substrate film 2. Among these, a layered product from which the substrate film 2 and the release layer 3 are excluded is referred to as a protective layer 8. However, the protective layer of the present is not intended to be limited by such a layered product as shown in FIG. 1.

With respect to the substrate film 1, not particularly limited, the same substrate film as those widely used in this field may be used. Specific examples of the substrate film include: polyesters having high heat resistance, such as polyethylene terephthalate, polyethylene naphthalate, polybutylene terephthalate, polyphenylene sulfide, polyether ketone and polyether sulfone; and plastic films, such as polypropylene, polycarbonate, cellulose acetate, derivatives of polyethylene, polyvinyl chloride, polyvinylidene chloride, polystyrene, polyamide, polyimide, polymethyl pentene and ionomer, and a layered product thereof and the like. The above-mentioned plastic film may be used as a drawn film, or may be used as an undrawn film. The thickness of the substrate film is properly selected by taking strength, heat resistance and the like into consideration, and is normally set in a range of from 1 to 100 μm.

The release layer 3, which is prepared so as to adjust the adhesion between the substrate film and the protective layer and also to carry out a superior peeling process of the protective layer, is formed from at least a resin and silicone oil.

With respect to the resin to be used for forming the release layer 3, various resins, such as silicone resin, fluorine resin, acrylic resin (which is used in a definition so as to include both of acrylic resin and methacrylic resin), water soluble resin, cellulose derivative resin, urethane-based resin, acetic acid-based resin, acrylic vinyl ether-based resin and maleic anhydride resin, may be used. Among these, preferable resins are a silicone-modified acrylic resin, in particular, a curing-type silicone-modified acrylic resin. The use of a resin whose softening point is extremely low tends to cause a problem that an appropriate transferring process is not carried out due to an insufficient heat resistant property, and the use of a resin whose softening point is extremely high tends to cause an insufficient dissolving property, resulting in a failure to be applied as a coating material. With respect to the commercial resin to be desirably used as the release layer of the present invention, for example, CELTOP® 226 (made by Daicel Chemical Industries, Ltd.) and CELTOP® 227 (made by Daicel Chemical Industries, Ltd.) are available.

With respect to the silicone oil to be added to the release layer, among those conventionally known products, modified silicone oils, in particular, polyether- and epoxy-modified silicone oils are preferably used, and, more preferably, polyether-modified silicone oils are used. From the viewpoint of preventing the occurrence of cissing when, upon forming a peeling layer on the release layer, a coating solution for peeling layer is applied, non-reactive type polyether-modified silicone oils are further preferably used.

With respect to the silicone oil, those having a viscosity of 500 mm$^2$/s or less (25° C.), preferably 80 to 450 mm$^2$/s (25° C.), more preferably 90 to 420 mm$^2$/s (25° C.), are used. When silicone oil having an extremely high viscosity is used, the corresponding effect is not exerted in the case of a small amount of addition. In the present invention, the viscosity of silicone oil is indicated by a viscosity value measured by an Oswald viscometer.

The amount of addition of the silicone oil to the release layer is preferably set in a range from 3 to 15% by weight, preferably from 5 to 10% by weight with respect to the release layer constituent resin. When the amount of addition is too much, cissing tends to occur in ink to be then applied, and when the amount of addition is too little, the resulting tendency is that a desired releasing property is not obtained.

With respect to the commercially available products of silicone oil that are applicable to the present invention, for example, the following products are listed: KF-6011 (made by Shin-Etsu Chemical Co., Ltd.), KF-355A (made by Shin-Etsu Chemical Co., Ltd.), X-22-4741 (made by made by Shin-Etsu Chemical Co., Ltd.), X-22-4742 (made by Shin-Etsu Chemical Co., Ltd.), X-22-4952 (made by Shin-Etsu Chemical Co., Ltd.) and X-22-6266 (made by Shin-Etsu Chemical Co., Ltd.).

A curing agent may be added to the release layer 3. The curing agent to be added to the release layer is used for improving the adhesion to the substrate film and the peeling property to the protective layer. With respect to the curing agent, from the viewpoint of completing a reaction quickly through the quantity of heat of a drying hood in a gravure printing process, an aluminum chelate-based curing agent, an isocyanate compound, a melamine compound or the like is preferably used. One of those conventionally-known products may be used as a curing agent, and with respect to the commercially-available products, for example, CELTOP® CAT-A (aluminum chelate-based curing agent) (made by Daicel Chemical Industries, Ltd.) or the like is available.

The amount of use of the curing agent is set in a range from 1 to 10% by weight, preferably from 3 to 7% by weight, with respect to the constituent resin of the release layer. When the amount of use thereof is too large, the pot life tends to be shortened. When the amount of use thereof is too small, a desired releasing property tends to become unobtainable.

In addition, from the viewpoints of improving the coating property and of adjusting the degree of luster, additives, such as a leveling agent, an antifoamer, a surfactant, a fluorescent whitener, an ultraviolet-ray absorbing agent and inorganic or organic fine particles, may be added to the release layer.

The release layer is formed through processes in which: a coating solution, prepared by dissolving or decomposing the above-mentioned resin, silicone oil, curing agent and other additives in a solvent such as water and an organic solvent, is applied thereto by using a conventionally-known coating method such as a wire coating method, and dried thereon. The thickness of the release layer is normally set in a range from 0.1 to 5 μm, preferably from 0.5 to 2.0 μm.

The protective layer is formed so that it is separated from the peeling layer 4 through the transferring process and that the release layer 3 is allowed to remain on side of the substrate film 2.

The peeling layer 4 is formed by a water-based coating solution. Examples thereof include those containing at least polyvinyl alcohol and an inorganic filler.

With respect to polyvinyl alcohol to be used, it is set to have a number-average molecular weight (Mn) of 50000 to 120000, preferably 60000 to 100000, and a degree of saponification of 80% or more. With respect to the degree of saponification, the higher the value, the better. Polyvinyl alcohol is a component that shoulders the water resistant property (solvent resistant property).

In the present invention, the molecular weight of polyvinyl alcohol is given as a value found by a commonly-used method in which calculations are made based upon measurements on the specific viscosity by the use of a capillary viscometer. The degree of saponification refers to a rate of an actual saponification value to the theoretical value of saponification value in the case of complete saponification, and is found through a commonly-used method in which the amount of alkali required for saponification is found through titration and this is used for the corresponding calculations.

With respect to the inorganic filler, for example, silica, titania, alumina, nylon filler, or the like, preferably silica, is used. The inorganic filler to be used has an alkaline property and an average particle size of 100 nm or less. With respect to the particle size, the smaller, the better. When the particle size of the inorganic filler is too large, a problem arises in which the transparency of the coat film is lowered. When the inorganic filler fails to have an alkaline property, a problem arises in which, when, upon forming an ink, it is mixed with polyvinyl pyrrolidone, the resulting solution is gelatinized.

The amount of use of the inorganic filler is set to 90% by weight or less, preferably from 20 to 80% by weight, with respect to the total weight of the peeling layer. When the amount of use is too small, the stamping property tends to deteriorate. When the amount of use is too large, the water-resistant property (solvent-resistant property) and the transparency of the film tend to deteriorate.

From the viewpoints of improving stamping property and the like, polyvinyl pyrrolidone may be added to the peeling layer. In this case, with respect to polyvinyl pyrrolidone, it is preferably set to have a number-average molecular weight (Mn) of 350000 to 3500000, preferably 1000000 to 2000000 and a K-value of 60 to 120.

In the present invention, the molecular weight of polyvinyl pyrrolidone is indicated by a value measured by the GPC method. The K-value refers to a scale of the molecular weight that is closely correlated with the viscosity derived from a relational expression $(\log \eta/c)=(75K^2/(1+1.5Kc))+K$, where the specific viscosity is indicated by $\eta$ and the solution concentration is indicated by c (g/dL). The specific viscosity is given as a value measured through a commonly-used method in which a capillary viscometer is used.

Upon application of polyvinyl pyrrolidone, the rate PVA/PVP (weight ratio) between polyvinyl alcohol (PVA) and polyvinyl pyrrolidone (PVP) is set in a range from 5/1 to 1/5, preferably from 1/2 to 2/1. When an excessive amount of polyvinyl alcohol is used, the stamping property is lowered. when an excessive amount of polyvinyl pyrrolidone is used, the water-resistant property (solvent-resistant property) deteriorates.

The total amount of use of the polyvinyl alcohol and polyvinyl pyrrolidone is set to 20 to 80% by weight, preferably 40 to 60% by weight, with respect to the total weight of the peeling layer.

Coating-property improving agents, such as a leveling agent and an antifoamer, and additives, such as a fluorescent whitener and a ultraviolet-ray absorbing agent, may be added to the peeling layer in a range from 0.01 to 5% by weight with respect to the total weight of the peeling layer.

The peeling layer is formed through processes in which: an aqueous coating solution, prepared by dissolving or decomposing polyvinyl alcohol, polyvinyl pyrrolidone, an inorganic filler and other additives in a solvent such as water and an organic solvent, is applied to a substrate film or a release layer formed on the substrate film by using a conventionally known coating method such as a wire coating method, and dried thereon. The thickness of the peeling layer is normally set in a range from 0.01 to 2 μm, preferably 0.1 to 0.5 μm.

The porous layer 5 is formed from at least polyvinyl alcohol, an inorganic filler and a curing agent. With respect to polyvinyl alcohol and inorganic filler, the same materials as those used for the peeling layer may be adopted.

Polyvinyl alcohol is a component that shoulders the water resistant property and solvent resistant property. The amount of use of polyvinyl alcohol is set in a range from 5 to 50% by weight, preferably 10 to 40% by weight, with respect to the total weight of the porous layer. When the amount is too large, a problem of tailing arises in the coat film; in contrast, when the amount is too small, the solvent-resistant property is lowered.

The amount of use of the inorganic filler is set in a range from 50 to 95% by weight, preferably from 60 to 95% by weight, with respect to the total weight of the porous layer. When the amount is too large, a problem arises in which the coat film deteriorates in its solvent resistant property; in contrast, when the amount is too small, a problem arises in which the foil-separating property deteriorates.

The curing agent to be added to the porous layer is used for applying a water resistant property and a solvent resistant property to polyvinyl alcohol, and for example, an isocyanate compound, a melamine compound and a chelating agent are used, and a melamine compound is preferably used. The amount of use of the curing agent is set in a range from 0.01 to 1% by weight, preferably from 0.05 to 5% by weight, with respect to polyvinyl alcohol. When the amount of use of the curing agent is too large, the foil-separating property deteriorates. When the amount of use of the curing agent is too small, the water resistant property and the solvent resistant property deteriorate.

In addition, coating-property improving agents, such as a leveling agent and an antifoamer, and additives, such as a fluorescent whitener and a ultraviolet-ray absorbing agent, may be added to the porous layer in a range from 0.01 to 5% by weight with respect to the total weight of the porous layer.

The porous layer is formed through processes in which: a coating solution, prepared by dissolving or decomposing polyvinyl alcohol, inorganic filler, a curing agent and other additives in a solvent such as water and an organic solvent, is applied to the peeling layer by using a conventionally known coating method such as a wire coating method, and cured and dried thereon. The thickness of the porous layer is normally set in a range from 0.1 to 2 μm, preferably from 0.3 to 1 μm.

The primer layer 6 is mainly formed from a polymaleic anhydride resin and an acrylic resin, and is preferably formed from methyl polymethacrylate resin. The primer layer 6 has a function for ensuring adhesion between the porous layer 6 and a heat seal layer to be further formed thereon, and therefore, is required to exert a high compatibility with a heat seal layer (solvent-based resin) which will be described below, needs to be soluble to an alcohol-based solvent and a ketone-based solvent, and also needs to have a water resistant property to a certain degree. The primer layer is formed from these viewpoints.

With respect to the polymaleic anhydride resin, those having a number-average molecular weight (Mn) of 50000 to 500000, preferably 100000 to 300000, are used. In the present invention, the molecular weight of polymaleic anhydride is indicated by a value measured by the GPC method.

With respect to the acrylic resin, those resins having a weight-average molecular weight (Mw) of 10000 to 100000, preferably 20000 to 50000, are used. In the present invention, the molecular weight of acrylic resin is indicated by a value measured by the GPC method.

With respect to polymaleic anhydride resin and acrylic resin, these materials are used at a rate in a range from 5/1 to 1/5, preferably from 1/2 to 2/1. When an excessive amount of polymaleic anhydride resin is used, problems arise in which the water resistant property deteriorates and the adhesion to the heat seal layer is lowered; in contrast, when an excessive amount of acrylic resin is used, problems arise in which the solvent resistant property deteriorates and the adhesion to the porous layer is lowered.

The total amount of use of the polymaleic anhydride resin and the acrylic resin is set to 50% by weight or more, preferably to 90% by weight or more, with respect to the total weight of the primer layer.

It is preferable that urethane polyol is added to the primer layer. This urethane polyol is used for improving the adhesion to the heat seal layer.

Upon addition, the amount of urethane polyol is set in a range from 1 to 15% by weight, preferably from 5 to 10% by weight, with respect to the total amount of the primer layer. When the amount of use is too large, the transparency of the film deteriorates; in contrast, when the amount of use is too small, the effect of improving the adhesion is not exerted sufficiently.

In addition, coating-property improving agents, such as a leveling agent and an antifoamer, and additives, such as a fluorescent whitener and a ultraviolet-ray absorbing agent, may be added to the primer layer in a range from 0.01 to 5% by weight with respect to the total weight of the primer layer.

The primer layer is formed through processes in which: a coating solution, prepared by dissolving or dispersing a polymaleic anhydride resin, an acrylic resin and urethane polyol, if necessary, and other additives in a solvent such as an organic solvent, is applied onto the porous layer by using a conventionally known coating method such as a wire coating method, and cured and dried thereon. The thickness of the primer layer is normally set in a range from 0.1 to 2 μm, preferably from 0.2 to 1 μm.

The heat seal layer shoulders the adhesion of a protective layer to an image surface. With respect to the resin forming the heat seal layer, any one of conventionally known resins in which a sticker, a heat-sensitive bonding agent and the like are blended may be used, and those thermoplastic resins having a glass transition temperature (Tg) in a range from 50 to 80° C. are preferably used. Specific examples of these thermoplastic resins include: polyester resin, vinyl chloride-vinyl acetate copolymer resin, acrylic resin, butyral resin, epoxy resin, polyamide resin and vinyl chloride resin. Additives, such as an ultraviolet-ray absorbing agent, an antioxidant and a fluorescent whitener, may be added to the heat seal layer.

The heat seal layer is formed through processes in which: a coating solution, prepared by dissolving or decomposing the above-mentioned resin and other additives in a solvent such as an organic solvent, is applied onto the primer layer by using a conventionally known coating method such as a wire coating method, and cured and dried thereon. The thickness of the heat seal layer is normally set in a range from 0.1 to 10 μm, preferably from 0.5 to 5 μm.

In the present invention, a back layer may be formed on the other face of the substrate film. The back layer is placed so as to prevent heat seal between a heating device such as a thermal head and the substrate film 2 and provide a smooth traveling operation. Examples of the resin to be used for this back layer include cellulose-based resins, such as ethyl cellulose, hydroxy cellulose, hydroxypropyl cellulose, methyl cellulose, cellulose acetate, cellulose butyrate, nitrocellulose; polyvinyl-based resins, such as polyvinyl alcohol, polyvinyl acetate, polyvinyl butyral, polyvinyl acetal and polyvinyl pyrrolidone; acrylic resins, such as polymethyl methacrylate, polyethyl acrylate, polyacrylamide and acrylonitrile-styrene copolymer; polyamide resin; polyvinyl toluene resin; coumarone indene resin; polyester resin; polyurethane resin; and a single substance or a mixture of natural or synthetic resins, such as silicone modified or fluorine-modified urethane. In order to further improve the heat resistance of the back layer, it is preferable that, among the above-mentioned resins, a resin having a hydroxyl group-based reactive group (for example, butyral resin, acetal resin and the like) is used in combination with polyisocyanate or the like as a crosslinking agent to form a crosslinked resin layer.

In order to impart a sliding property with the thermal head, a solid-state or liquid-state release agent or lubricant may be added to the back layer so as to provide a heat-resistant lubricating property. Examples of the release agent or lubricant include various waxes such as polyethylene wax and paraffin wax; various surfactants, such as higher fatty alcohol, organopolysiloxane, anionic surfactants, cationic surfactants, amphoteric surfactants, nonionic surfactants and fluorine-based surfactants; organic carboxylic acids and derivatives thereof, fluorine-based resins, silicone-based resins, fine particles of inorganic compounds such as talc and silica. The amount of lubricant to be contained in the back layer is set in a range from 5 to 50% by weight, preferably from 10 to 30% by weight, in the back surface.

The back layer is formed through processes in which: a coating solution, prepared by dissolving or dispersing the resin and the other additives in a solvent such as water and an organic solvent, is applied to the substrate film by using a normal coating method such as a wire coating method, and the resulting layer is dried thereon. The thickness of the back layer is normally set in a range from 0.1 to 10 μm, more preferably from 0.5 to 5 μm.

The protective layer thermal transfer film of the present invention is not intended to be limited by the above-mentioned mode, and is desirably formed in accordance with the intended purpose and the like as a film, such as a composite protective layer thermal transfer film of a thermally transferring protective layer with a heat sublimable color material layer and a composite protective layer thermal transfer film of a thermally transferring protective layer with a heat meltable color material layer. In the case of the former composite protective layer thermal transfer film, as long as the image-receiving member has a receiving layer for dyes, an image-forming process through a thermal transfer system and a transferring process of the protective layer to the image-receiving member are simultaneously carried out.

With respect to another example of the protective-layer transferring film, for example, a protective layer thermal transfer film in which a thermal transfer protective layer and at least one color material layer selected from the group consisting of a heat sublimable color material layer and a heat meltable color material layer are formed on one surface of a substrate film in a face-sequential manner may be used.

Figure 2:
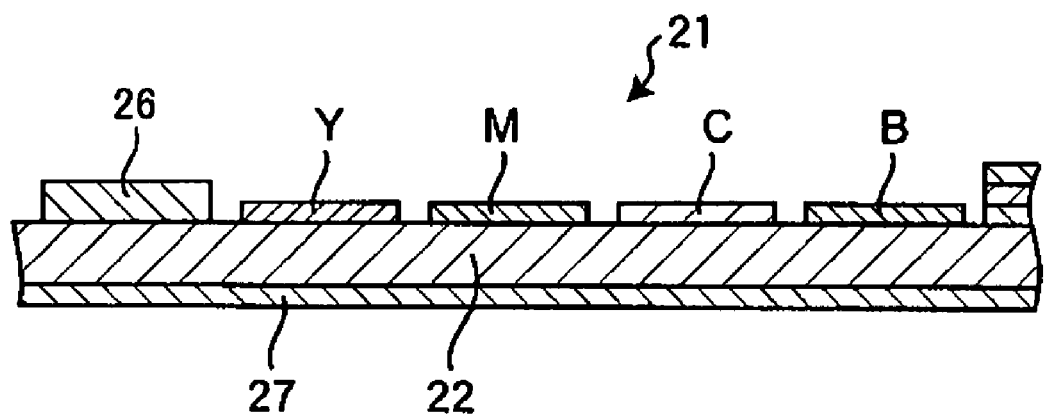
FIG. 2 is a schematic cross-sectional view that shows one embodiment of a protective layer thermal transfer sheet.

FIG. 2 is a schematic cross-sectional view that shows another example of the protective layer thermal transfer film of the present invention. In FIG. 2, the protective layer thermal transfer film 21 of the present invention is constituted by a heat sublimable color material layer Y, a heat sublimable color material layer M, a heat sublimable color material layer C, a heat sublimable color material layer B and a thermal transfer protective layer 26 that are formed on one surface of a substrate film 22 in a face-sequential manner, and a back layer 27 is formed on the other face of the substrate film 22. The heat sublimable color material layers Y, M, C and B, shown in FIG. 2, may be replaced by heat meltable color material layers Y, M, C and B, or a mixed structure of these layers may be used.

Examples of the image-receiving member may include films formed by any substrate sheet, such as plain paper, wood free paper, tracing paper and a plastic film. The image-receiving member may have any one of shapes including a card, a post card, a passport, letter paper, report paper, a notebook and a catalogue.

Specific examples of the image-receiving member of the present invention include: share certificates, bonds, certificates, passbooks, train tickets, bicycle or horse race tickets, and premium tickets, such as stamps, postal stamps, theater tickets, entrance tickets and other tickets; various cards, such as cash cards, credit cards, prepaid cards, members cards, greeting cards, post cards, name cards, driver's licenses, IC cards and optical cards; cases such as cartons and containers; bags; forms, envelopes, tags, OHP sheets, slide films, bookmarks, calendars, posters, pamphlets, menus, passports, POP articles, coasters, displays, name plates, keyboards, cosmetics, ornaments, such as wristwatches and lighters; stationary such as writing materials and report paper; building materials, panels, emblems, keys, cloths, clothing, footwear, apparatuses such as radios, televisions, electronic calculators and OA devices, various sample catalogues, albums, outputs from computer graphics, medical image outputs, and the like.

The image on the image-receiving member may be formed through any one of the systems, such as an electrophotographic system, an ink-jet recording system and a thermal transfer recording system.

Since the image-receiving member on which the protective layer thermal transfer film has been transferred exerts a good fixing property for water based ink, it becomes possible to provide superior stamping property for water based type materials and writing property for water based ink or the like.

Upon application of the protective layer thermal transfer film of the present invention, a conventionally-known method of use for the protective layer thermal transfer film may be adopted as it is. For example, the layer face of the heat seal layer of the protective layer thermal transfer film of the present invention is superposed on the image-receiving member so that the protective layer may be thermally transferred onto the image-receiving member.

EXAMPLES

Examples of the present invention will be explained below. Articles used in the present Examples are briefly listed below. Here, "%" refers to "% by weight", unless otherwise indicated.

CELTOP® 226: Silicone-modified acrylic resin, made by Daicel Chemical Industries, Ltd., solid component 50%

CELTOP® 227: Silicone-modified acrylic resin, made by Daicel Chemical Industries, Ltd., solid component: 50%

DIANAL® BR-87: Acrylic resin, made by Mitsubishi Rayon Co., Ltd., Mw: 25000

CELTOP® CAT-A: Curing agent, made by Daicel Chemical Industries, Ltd., solid component: 10%

KF-6011: Polyether-modified silicone oil, made by Shin-Etsu Chemical Co., Ltd., Viscosity 130 mm$^2$/s (25° C.)

KF-355A: Polyether-modified silicone oil, made by Shin-Etsu Chemical Co., Ltd., Viscosity 130 mm$^2$/s (25° C.)

X-22-4741: Epoxy, polyether-modified silicone oil, made by Shin-Etsu Chemical Co., Ltd., Viscosity 400 mm$^2$/s (25° C.)

X-22-4742: Polyether-modified silicone oil, made by Shin-Etsu Chemical Co., Ltd., Viscosity 300 mm$^2$/s (25° C.)

X-22-4952: Polyether-modified silicone oil, made by Shin-Etsu Chemical Co., Ltd., Viscosity 90 mm$^2$/s (25° C.)

X-22-6266: Polyether-modified silicone oil, made by Shin-Etsu Chemical Co., Ltd., Viscosity 420 mm$^2$/s (25° C.)

X-22-162C: Carboxyl-modified silicone oil, made by Shin-Etsu Chemical Co., Ltd., Viscosity 230 mm$^2$/s (25° C.)

KF-6003: Carbinol-modified silicone oil, made by Shin-Etsu Chemical Co., Ltd., Viscosity 110 mm$^2$/s (25° C.)

X-22-1821: Phenol-modified silicone oil, made by Shin-Etsu Chemical Co., Ltd., Viscosity 100 mm$^2$/s (25° C.)

KF-8001: Amino-alkoxy-modified silicone oil, made by Shin-Etsu Chemical Co., Ltd., Viscosity 250 mm$^2$/s (25° C.)

KF-410: Methylstyryl-modified silicone oil, made by Shin-Etsu Chemical Co., Ltd., Viscosity 900 mm$^2$/s (25° C.)

KF-413: Alkyl-modified silicone oil, made by Shin-Etsu Chemical Co., Ltd., Viscosity 190 mm$^2$/s (25° C.)

X-22-715: Higher fatty acid ester-modified silicone oil, made by Shin-Etsu Chemical Co., Ltd., Viscosity 15000 mm$^2$/s (25° C.)

KF-96-100: Dimethyl silicone oil, made by Shin-Etsu Chemical Co., Ltd., Viscosity 100 mm$^2$/s (25° C.)

KF-965-100: Dimethyl silicone oil, made by Shin-Etsu Chemical Co., Ltd., Viscosity 100 mm$^2$/s (25° C.)

RS-1717: Polyvinyl alcohol, made by Kuraray, Co., Ltd., Degree of saponification 95%, Mn: 80000

PVP-K90: Polyvinyl pyrrolidone, made by ISP Japan Ltd., Mn: 1570000 (K-value=90)

Snowtex 20L: Colloidal silica, made by Nissan Chemical Industries, Ltd., Average particle size: 40 nm C318: Polyvinyl alcohol, made by Kuraray, Co., Ltd., Degree of saponification 80%, Mn: 80000

Snowtex OL-40: Colloidal silica, made by Nissan Chemical Industries, Ltd., Average particle size: 40 nm VYLONAL® MD-1500: Polyester, made by Toyobo Co., Ltd.

Sumirez Resin® 5004: Curing agent made by Sumitomo Chemical Co., Ltd.,

GANTREZ® AN-119: Polymaleic anhydride, made by ISP Japan Ltd., Mn: 130000

DIANAL® BR-87: Polymethyl methacrylate (PMMA) made by Mitsubishi Rayon Co., Ltd., Mw: 25000

SANPRENE® IB-114: Urethane polyol, made by Sanyo Chemical Industries, Ltd.,

DIANAL® LR-209: Acrylic polyol, made by Mitsubishi Rayon Co., Ltd.

VYLON® 700: Polyester, made by Toyobo Co., Ltd., Mn: 9000

PUVA-50M-40TM: (UVA)-containing acrylic resin, made by Otsuka Chemical Co., Ltd., Mn: 30000

TINUVIN® 900: UVA compound, made by Ciba Specialty Chemicals.

Sylysia 310P: Silica filer, made by Fuji Silysia Chemical Ltd., Average particle size 3 μm UVA is the abbreviation of "ULTRA-VIOLET LIGHT ABSORBER".

Formation of protective layer thermal transfer film (ribbon) (Examples 1 to 11, Comparative Examples 1 to 14)

First Layer (Release Layer)

The corresponding mixed matter shown in Table 1 ("%" in Table represents % by weight) was diluted by a solvent (toluene/methylethylketone (MEK)=1/1) so that an ink for a release layer was prepared. The resulting ink was applied onto a PET film having a thickness of 4.5 μm by using a wire bar coater (#3) with an amount of coat of 1.0 g/m$^2$ (when dried, the same is true hereinbelow). The resulting coat film was dried in an oven at 110° C. for one minute.

Second Layer (Peeling Layer)

A peeling layer was formed in accordance with specification 1 or 2 of peeling layer shown in Table 1.

Specification 1 of Peeling Layer
RS-1717(PVA): 25% by weight
PVP-K90: 25% by weight
Snowtex 20L: 50% by weight The above-mentioned mixed matter was diluted by a solvent (water/isopropyl alcohol)(IPA)=1/1) so that an ink for a peeling layer in which the solid components accounted for 5% was prepared. The resulting ink was applied onto the release layer by using a wire bar coater (#3) with an amount of coat of 0.3 g/m$^2$. The resulting coat film was dried in an oven at 110° C. for one minute.

Specification 2 of Peeling Layer
RS-1717(PVA): 20% by weight
Snowtex 20L: 80% by weight The above-mentioned mixed matter was diluted by a solvent (water/isopropyl alcohol)(IPA)=1/1) so that an ink for a peeling layer in which the solid components accounted for 5% was prepared. The resulting ink was applied onto the release layer by using a wire bar coater (#3) with an amount of coat of 0.3 g/m$^2$. The resulting coat film was dried in an oven at 110° C. for one minute.

TABLE 1

| | | Release layer | | | | | | Peeling layer |
|---|---|---|---|---|---|---|---|---|
| | | Silicone | | | | | | |
| | Binder | Silicone Grade | Addition rate (to 100 of resin) | | Modifying | group | Position | Viscosity 25° C. mm$^2$/s | Peeling layer specification |
| Example 1 | CELTOP ® 226 | KF-6011 | 5 | Modified silicone oil | Non-reactive type | Polyether | Side chain | 130 | 2 |
| Example 2 | | | 10 | | | | Side chain | 130 | 2 |
| Example 3 | | KF-355A | 5 | | | | Side chain | 150 | 2 |
| Example 4 | | | 10 | | | | Side chain | 150 | 2 |
| Example 5 | | X-22-4741 | 5 | | Reative type | Epoxy, Polyether | Side chain | 400 | 2 |
| Example 6 | | X-22-4742 | 5 | | | Polyether | Side chain | 300 | 2 |
| Example 7 | | X-22-4952 | 5 | | | | Side chain | 90 | 2 |
| Example 8 | | X-22-6266 | 5 | | | | Side chain | 420 | 2 |
| Example 9 | CELTOP ® 227 | KF-355A | 10 | | Non-reactive | | Side chain | 150 | 2 |
| Example 10 | | | 5 | | type | | Side chain | 150 | 1 |
| Example 11 | | | 10 | | | | Side chain | 150 | 1 |
| Comparative Example 1 | CELTOP ® 226 | No addition | 5 | — | — | — | — | — | 2 |
| Comparative Example 2 | | X-22-162C | 5 | Modified silicone oil | Reative type | Carboxyl | both ends | 230 | 2 |
| Comparative Example 3 | | KF-6003 | 5 | | | Carbinol | both ends | 110 | 2 |
| Comparative Example 4 | | X-22-1821 | 5 | | | Phenol; | both ends | 100 | 2 |
| Comparative Example 5 | | KF-8001 | 5 | | | Amino, Alkoxy | Side chainboth ends | 250 | 2 |
| Comparative Example 6 | | KF-410 | 5 | | | Methylstyryl | Side chain | 900 | 2 |
| Comparative Example 7 | | KF-413 | 5 | | | Alkyl | Side chain | 190 | 2 |
| Comparative Example 8 | | X-22-715 | 5 | | | Higher fatty acid ester | Side chain | 15000 | 2 |
| Comparative Example 9 | | KF96-100 | 5 | Dimethyl silicone oil | | — | — | 100 | 2 |
| Comparative Example 10 | | KF965-100 | 5 | | | — | — | 100 | 2 |
| Comparative Example 11 | CELTOP ® 227 | KF-355A | 20 | Modified Silicone Oil | Non-reactive type | Polyether | Side chain | 150 | 2 |
| Comparative Example 12 | DIANAL ® BR-87 | KF-355A | 20 | | | | Side chain | 150 | 2 |
| Comparative Example 13 | | | 5 | | | | Side chain | 150 | 2 |
| Comparative Example 14 | | | 10 | | | | Side chain | 150 | 2 |

Third Layer (Porous Layer)
RS-1717(PVA): 20% by weight
Snowtex OL-40 (Colloidal silica): 76% by weight
Sumirez Resin® 5004 (Curing agent): 4% by weight The above-mentioned mixed matter was diluted by a solvent (water/IPA=1/1) so that the solid components accounted for 15% to prepare an ink for a porous layer. The resulting ink was applied onto the PET film coated with the second layer by using a wire bar coater (#3) with an amount of coat of 0.8 g/m². The resulting coat film was dried in an oven at 110° C. for one minute.

Fourth Layer (Primer Layer)
GANTREZ® AN-119 (Polymaleic anhydride): 50% by weight
DIANAL® BR-87 (PMMA): 42% by weight
SANPRENE® IB-114B (Urethane polyol): 8% by weight The above-mentioned mixed matter was diluted by a solvent (MEK/IPA=5/1) so that the solid components accounted for 10% to prepare an ink for a primer layer. The resulting ink was applied onto the PET film coated with the third layer by using a wire bar coater (#3) with an amount of coat of 0.4 g/m². The resulting coat film was dried in an oven at 110° C. for one minute.

Fifth Layer (Heat Seal (HS) Layer)
VYLON® 700 (Polyester): 72% by weight
PUVA-50M-40TM (UVA-containing acrylic resin): 18% by weight
TINUVIN® 900 (UVA compound): 8% by weight
Sylysia 310P (Silica filer, average particle size 3 µm): 2% by weight The above-mentioned mixed matter was diluted by a solvent (toluene/MEK=1/1) so that the solid components accounted for 20% to prepare an ink for a heat seal layer. The resulting ink was applied onto the PET film coated with the fourth layer by using a wire bar coater (#4) with an amount of coat of 1.3 g/m². The resulting coat film was dried in an oven at 110° C. for one minute.

[Evaluation]
[Cissing]

The cissing, exerted upon application of the ink for peeling layer to the release layer, was visually observed, and ranked in the following manner.
○: No cissing occurred;
Δ: Although cissing slightly occurred, no problem was caused in forming the film; and
x: Cissing occurred (causing a problem in forming the film)

The results are shown in Table 2.

TABLE 2

| | Properties | | | |
|---|---|---|---|---|
| | | Peeling force | | |
| | Peeling layer Cissing | Non-stored | After 40/90/24H | Stamping Property |
| Example 1 | ○ | 18 | 30 | ◎ |
| Example 2 | ○ | 12 | 20 | ◎ |
| Example 3 | ○ | 11 | 15 | ◎ |
| Example 4 | ○ | 8 | 12 | ◎ |
| Example 5 | Δ | 18 | 50 | ◎ |
| Example 6 | Δ | 11 | 50 | ◎ |
| Example 7 | Δ | 30 | 50 | ◎ |
| Example 8 | Δ | 20 | 50 | ◎ |
| Example 9 | ○ | 20 | 35 | ◎ |
| Example 10 | ○ | 20 | 30 | ◎ |
| Example 11 | ○ | 15 | 25 | ◎ |
| Comparative Example 1 | ○ | 200 | — | — |
| Comparative Example 2 | X | — | — | — |
| Comparative Example 3 | X | — | — | — |
| Comparative Example 4 | X | — | — | — |
| Comparative Example 5 | X | — | — | — |
| Comparative Example 6 | ○ | 150 | — | — |
| Comparative Example 7 | X | — | — | — |
| Comparative Example 8 | ○ | 150 | — | — |
| Comparative Example 9 | ○ | 150 | — | — |
| Comparative Example 10 | ○ | 110 | — | — |
| Comparative Example 11 | X | — | — | — |
| Comparative Example 12 | X | — | — | — |
| Comparative Example 13 | ○ | 100 | 210 | — |
| Comparative Example 14 | ○ | 60 | 100 | — |

[Peeling Force]

A protective layer was printed by using a test printer (printing conditions: line speed 20 ms/line, pulse duty 65%, voltage 14.5 V, tone value 255/255, printing width 8 cm), and a peeling force exerted upon separation with 180 degrees was measured by using a load cell (peeling speed 1000 mm/min).

The peeling force was measured after the formation of the protective-layer transfer film as well as after the storage thereof under the environment of 40° C. and 90% in humidity for 24 hours.

When the peeling force is 50 to 60 g or less, no problem is raised in the printing operations under any printer operational environment.

The results are collectively shown in Table 2. In Table 2, "-" refers to the fact that no evaluation was made due to cissing or the like (unevaluated).

(Stamping Property)
(Preparation of Printed Article)

An image was formed through a printer (Photographic Printer DPP-SV55, made by Sony Corporation) by using a thermal transfer film on which respective colorant layers of yellow, magenta and cyan were affixed. Then, each of the protective layer thermal transfer films produced through the above-mentioned Examples and Comparative Examples was superposed on the image-formed portion, and the protective layer was transferred from the protective layer thermal transfer film in a manner so as to cover the image-formed portion by using the printer (Photographic Printer DPP-SV55, made by Sony Corporation) to form a printed article coated with the protective layer. A stamp pattern was formed on the surface of the printed article thus obtained by using a water based stamp ink, and a desirable stamp pattern was obtained on each of the printed articles derived from Examples (◎). With respect to the printed articles of Comparative Examples, the stamping property was not evaluated due to cissing, or no evaluation was available on the stamping property because of an abnormal transferred face after the printing, caused by a high peeling force. The results are collectively shown in Table 2. In the Table, "-" refers to the fact that no evaluation was made due to cissing or the like (unevaluated).

The invention claimed is:

1. A protective layer thermal transfer film, comprising:
at least a release layer, and
a protective layer, formed on one surface of a substrate film;
the release layer being formed from at least a silicone-modified resin and polyether-modified silicone oil; and
the amount of addition of the polyether-modified silicone oil to the release layer being in a range of 3 to 15% by weight with respect to the release layer constituent resin.

2. The protective layer thermal transfer film of claim 1, wherein the protective layer contains at least a peeling layer, the peeling layer is formed from an aqueous coating solution.

3. The protective layer thermal transfer film of claim 2, wherein the peeling layer comprises at least a water-based resin and silica particles; the silica particles being set to 90% by weight or less as solids.

4. The protective layer thermal transfer film of claim 1, wherein the polyether-modified silicone oil has a viscosity of 500 $mm^2/s$ or less (25° C.).

5. The protective layer thermal transfer film of claim 1, wherein a heat sublimable color material layer and/or a heat meltable color material layer are formed on one face of the substrate film together with the thermally transferable protective layer.

* * * * *